E. T. STARR.
Flexible Power-Conveyors for Dental-Engines.
No. 157,646. Patented Dec. 8, 1874.
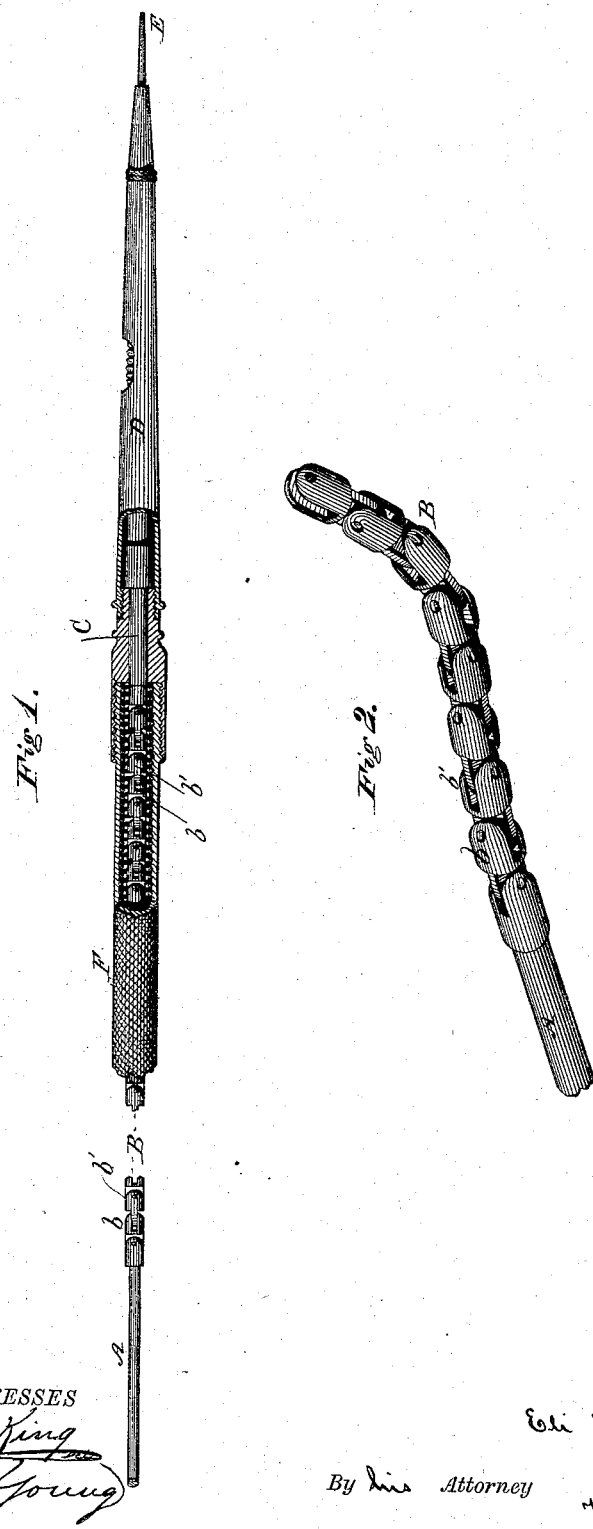

UNITED STATES PATENT OFFICE.

ELI T. STARR, OF PHILADELPHIA, PENNSYLVANIA, ASSIGNOR TO SAMUEL S. WHITE, OF SAME PLACE.

IMPROVEMENT IN FLEXIBLE POWER-CONVEYERS FOR DENTAL ENGINES.

Specification forming part of Letters Patent No. 157,646, dated December 8, 1874; application filed November 25, 1874.

*To all whom it may concern:*

Be it known that I, ELI T. STARR, of the city and county of Philadelphia, in the State of Pennsylvania, have invented new and useful Improvements in Dental Engines, of which the following is a specification:

My invention relates to dental engines of the class in which motion is communicated from a power-driven shaft, through a flexible shaft, to a tool mounted in a suitable hand-piece, by which means the angle at which the tool is working relatively to the driving-shaft may be freely varied without interruption to the transmission of the driving-power.

Jointed shafts, coiled-wire shafts, rattan, and cat-gut have all heretofore been used, or proposed to be used, as a flexible driving-shaft, but experience has demonstrated that none of these devices work as perfectly as is desirable. The long jointed shafts are not sufficiently flexible; the wire coil is liable to kink; the rattan to twist apart; and the cat-gut, apparently, scarcely possesses sufficient rigidity for the purposes required.

It is the object of my invention to provide a flexible driving-shaft capable of yielding flexibly in all directions without interfering with the transmission of the driving-power, and yet be free from tendency to kink; to which ends my improvement consists in a flexible shaft for transmitting power, consisting of a chain or cable composed of short links, capable of flexing freely, and yet rigid under torsional strain. My improvement further consists in combining a stiff power-driven shaft, a flexible chain-cable, and a socket piece or chuck mounted in bearings in the hand-piece of a dental engine, and adapted to receive a dental tool. My invention further consists in combining a chain-cable driving-shaft with a flexible non-rotating sheath, in which said cable works.

In the accompanying drawings, which exemplify the best way now known to me of carrying out my invention, Figure 1 represents a view, partly in section, of so much of the apparatus as is necessary to illustrate the invention herein claimed, and Fig. 2 a view in perspective of a portion of the driving-shaft detached, and shown on an enlarged scale.

The shaft A, driven by power in any suitable well-known way, has a cable, B, pin-jointed to it at one end. This cable is, by preference, composed of links $b\ b'$, of the form shown in the drawing, each link being composed of a perforated plate of about half the depth of the link, and a forked head, the slot of which is at right angles to the plane of the plate, each plate being pin-jointed in the forks of the adjacent link. By this mode of construction the cable is free to flex laterally, but is quite rigid against torsional strains, as the plates fit snugly between the forks of the head in which they are pivoted. I have found by experience that a cable thus constructed is quite free from any tendency to kink. The ends of the cable farthest from the power-driven shaft A are pin-jointed to a chuck or socket-piece, C, turning in suitable bearings in a hand-piece, D. A tool, E, may be secured in this socket in a well-known way. A flexible sheath, F, of any suitable well-known construction, such, for instance, as that shown in Nelson Stow's patent of August 6, 1872, is secured at one end to the hand-piece, and at the other to the engine-frame. The cable is enveloped by, and works within, this flexible and non-rotating sheath.

I claim as of my own invention—

1. A chain-cable driving-shaft for dental engines, substantially as hereinbefore set forth, the same constituting a new article of manufacture.

2. The combination of a rotating power-driven shaft, the flexible chain-cable driving-shaft, the socket or chuck, and the hand-piece.

3. The combination of the hand-piece, the flexible non-rotating sheath connecting the hand-piece with the frame of the engine, and a chain-cable driving-shaft rotating within said sheath.

In testimony whereof I have hereunto subscribed my name.

ELI T. STARR.

Witnesses:
JOSEPH I. PEYTON,
E. C. DAVIDSON.